US009395212B2

(12) United States Patent
Winarski

(10) Patent No.: US 9,395,212 B2
(45) Date of Patent: Jul. 19, 2016

(54) NANOTUBE AND GRAPHENE DIFFERENTIAL DISPLACEMENT SENSORS

(71) Applicant: Tyson York Winarski, Mountain View, CA (US)

(72) Inventor: Tyson York Winarski, Mountain View, CA (US)

( * ) Notice: Subject to any disclaimer, the term of this patent is extended or adjusted under 35 U.S.C. 154(b) by 389 days.

(21) Appl. No.: 14/222,668

(22) Filed: Mar. 23, 2014

(65) Prior Publication Data

US 2015/0268064 A1    Sep. 24, 2015

(51) Int. Cl.
*G01D 5/14* (2006.01)
*G01D 5/22* (2006.01)

(52) U.S. Cl.
CPC ................... *G01D 5/2291* (2013.01)

(58) Field of Classification Search
CPC .............................. G01D 5/14; G01D 5/2291
USPC .................... 73/514.16; 324/207.17
See application file for complete search history.

(56) References Cited

U.S. PATENT DOCUMENTS

| 8,060,943 | B1 * | 11/2011 | Popescu | B82Y 15/00 73/105 |
| 2004/0000985 | A1 * | 1/2004 | Komatsu | H01R 41/00 338/202 |
| 2005/0250305 | A1 * | 11/2005 | Al-Rabadi | B82Y 10/00 438/614 |
| 2011/0204020 | A1 * | 8/2011 | Ray | B82Y 25/00 216/13 |

FOREIGN PATENT DOCUMENTS

KR    20110078296 A  *  7/2011

OTHER PUBLICATIONS

Yan Xie et al. "Telescoping Self-Aligned Metal-Catalyzed Carbon Nanotube Piezoresistors As Strain Gauges". Oct. 2006. Case Western Reserve University, Cleveland, Ohio.*
K. Jensen. "Tunable Nanoresonators Constructed from Telescoping Nanotubes". May 2006. Department of Physics, University of California at Berkeley.*

* cited by examiner

*Primary Examiner* — Lisa Caputo
*Assistant Examiner* — Jamel Williams
(74) *Attorney, Agent, or Firm* — The Winarski Firm, PLLC

(57) ABSTRACT

A differential displacement sensor is disclosed that includes a pair of aligned stationary carbon nanostructures and a moveable carbon nanostructure. The moveable carbon nanostructure is configured to engage and move with respect to the pair of aligned stationary carbon nanostructures throughout a range of motion. Circuitry applies an excitation voltage across the pair of aligned stationary carbon nanostructures and the moveable carbon nanostructure to generate an output voltage proportional to a displacement of the moveable carbon nanostructure with respect to the pair of aligned stationary carbon nanostructures throughout the range of motion. Graphene sheets or carbon nanotubes may form the moveable carbon nanostructure or the pair of aligned stationary carbon nanostructures.

20 Claims, 13 Drawing Sheets

300

| Structure of Nanotube | Electrical Property |
|---|---|
| n = m | Metallic |
| n-m is a non-zero multiple of 3 | Semiconducting with a narrow band gap |
| Other combinations of n, m | Moderate semiconductor |

Fig. 3

NANOTUBE AND GRAPHENE DIFFERENTIAL DISPLACEMENT SENSORS

FIELD OF INVENTION

The present disclosure relates to the field of differential displacement sensors.

BACKGROUND

A position sensor is any device that permits position measurement. It can either be an absolute position sensor or a relative one (displacement sensor). Position sensors can be linear, angular, rotational or multi-axis.

SUMMARY

Carbon nanostructures are utilized to create differential displacement sensors. For example, dual-wall carbon nanotubes (DWCNT) are utilized to create linear-differential-displacement sensors. Alternatively, graphene sheets are used to create linear- and rotational-differential-displacement sensors. These differential displacement sensors achieve a doubling of the signal output which is directly proportional to displacement, and mitigation of common mode noise.

A differential displacement sensor is disclosed that includes a pair of aligned stationary carbon nanostructures. A moveable carbon nanostructure is configured to engage and move with respect to the pair of aligned stationary carbon nanostructures throughout a range of motion. Circuitry applies an excitation voltage across the pair of aligned stationary carbon nanostructures. The moveable carbon nanostructure generates an output voltage proportional to a displacement of the moveable carbon nanostructure with respect to the pair of aligned stationary carbon nanostructures throughout the range of motion.

The pair of aligned stationary carbon nanostructures can both be carbon nanotubes. The moveable carbon nanostructure may also be a carbon nanotube. The carbon nanotubes forming the pair of aligned stationary carbon nanostructures are axially aligned with the carbon nanotube forming the moveable carbon nanostructure.

In one embodiment, the carbon nanotubes forming the pair of aligned stationary carbon nanostructures both have the same inner diameter. In this embodiment, the carbon nanotube forming the moveable carbon nanostructure has an outer diameter smaller then the inner diameter of the carbon nanotubes forming the pair of aligned stationary carbon nanostructures. Each end of the carbon nanotube forming the moveable carbon nanostructure slides within one of the carbon nanotubes forming the pair of aligned stationary carbon nanostructures.

In another embodiment, the carbon nanotubes forming the pair of aligned stationary carbon nanostructures both have the same outer diameter. The carbon nanotube forming the moveable carbon nanostructure has an inner diameter larger then the outer diameter of the carbon nanotubes forming the pair of aligned stationary carbon nanostructures. Each end of the carbon nanotube forming the moveable carbon nanostructure slides over one of the carbon nanotubes forming the pair of aligned stationary carbon nanostructures.

The carbon nanotubes forming the moveable carbon nanostructure and the pair of aligned stationary carbon nanostructures are armchair carbon nanotubes. The sensor may also include an auxiliary nanowire secured to the moveable carbon nanostructure from which a differential output voltage is measured. The sensor may also include an auxiliary carbon nanotube secured to the moveable carbon nanostructure from which a differential output voltage is measured. The auxiliary carbon nanotube may have a zigzag configuration. The excitation voltage may be a DC voltage. The excitation voltage may also be an AC voltage. A chiral nanotube may be interposed between the carbon nanotube forming the moveable carbon nanostructure and the carbon nanotube forming the pair of aligned stationary carbon nanostructures.

In one embodiment, the pair of aligned stationary carbon nanostructures are both sheets of graphene. The moveable carbon nanostructure is also a sheet of graphene. The sheet of graphene forming the moveable carbon nanostructure rotates with respect to the graphene sheets forming the pair of aligned stationary carbon nanostructures. The sheet of graphene forming the moveable carbon nanostructure may move linearly with respect to the graphene sheets forming said pair of aligned stationary carbon nanostructures. In this embodiment, the sensor may also include a thin film dielectric layer. The graphene sheets forming the pair of aligned stationary carbon nanostructures are coplanar, residing in a first plane. The graphene sheet forming the moveable carbon nanostructure resides in a second plane parallel to the first plane. The thin film dielectric layer is interposed between said first and second planes. The moveable carbon nanostructure increasingly engages one of the pair of aligned stationary carbon nanostructures while simultaneously decreasingly engaging the other of one of the pair of aligned stationary carbon nanostructures when the moveable carbon nanostructure moves with respect to the pair of aligned stationary carbon nanostructures.

A nanotube displacement sensor is disclosed that includes a first stationary carbon nanostructure. It also includes a moving carbon nanostructure. The moving carbon nanostructure partially engages the first stationary carbon nanostructure throughout a range of motion. Circuitry applies an excitation voltage across the first stationary carbon nanostructure and the moving carbon nanostructure to generate an output voltage proportional to the displacement of the moving carbon nanostructure with respect to the first stationary carbon nanostructure throughout the range of motion. The first stationary carbon nanostructure is a carbon nanotube and the moving carbon nanostructure is a carbon nanotube in one embodiment. The first stationary carbon nanostructure is a sheet of graphene and the moving carbon nanostructure is a sheet of graphene in another embodiment.

Further aspects of the invention will become apparent as the following description proceeds and the features of novelty which characterize this invention are pointed out with particularity in the claims annexed to and forming a part of this specification.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

FIG. 3 shows which carbon nanotubes are metallic, narrow bandgap, and moderate semiconductors;

DETAILED DESCRIPTION

While the invention has been shown and described with reference to a particular embodiment thereof, it will be understood to those skilled in the art, that various changes in form and details may be made therein without departing from the spirit and scope of the invention.

Figure 1:
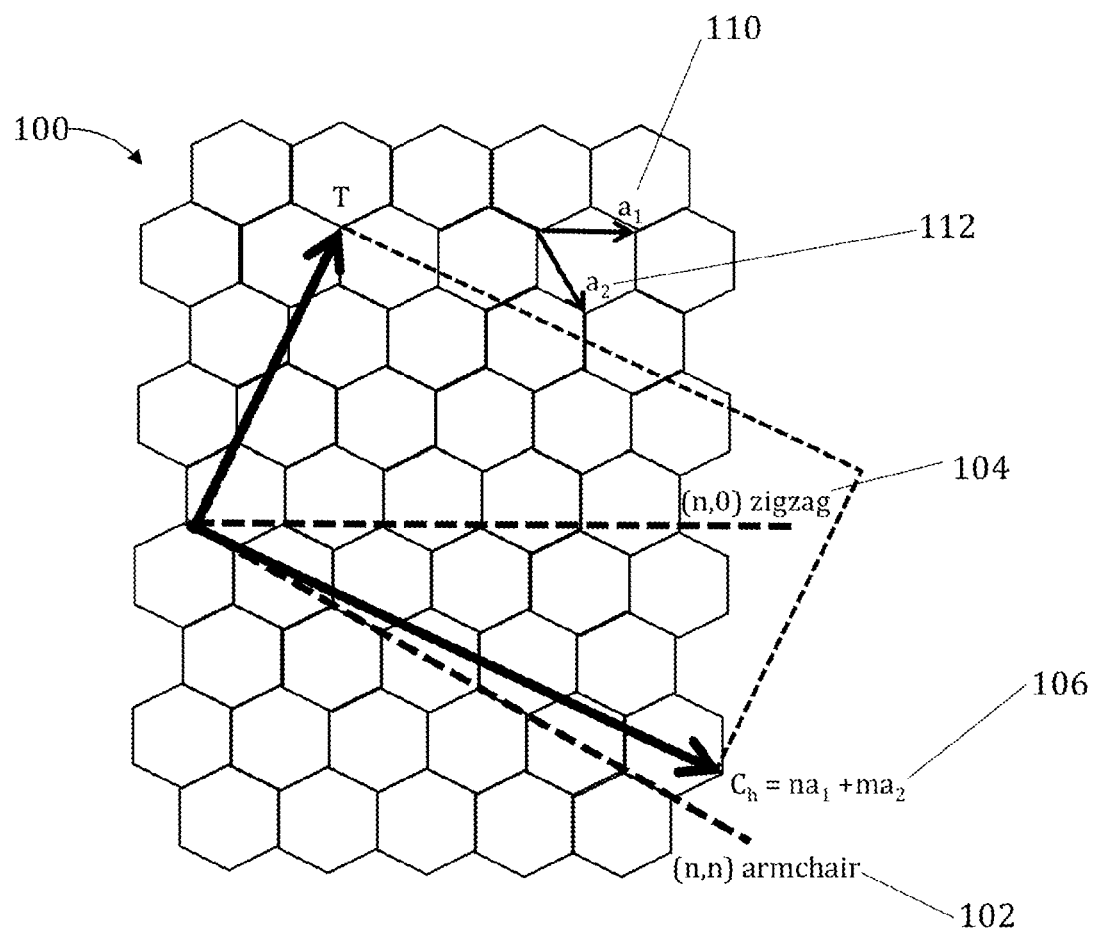
FIG. 1 shows the carbon nanotube coordinate system for determining which carbon nanotubes are armchair, zigzag, or chiral.
Figure 2:
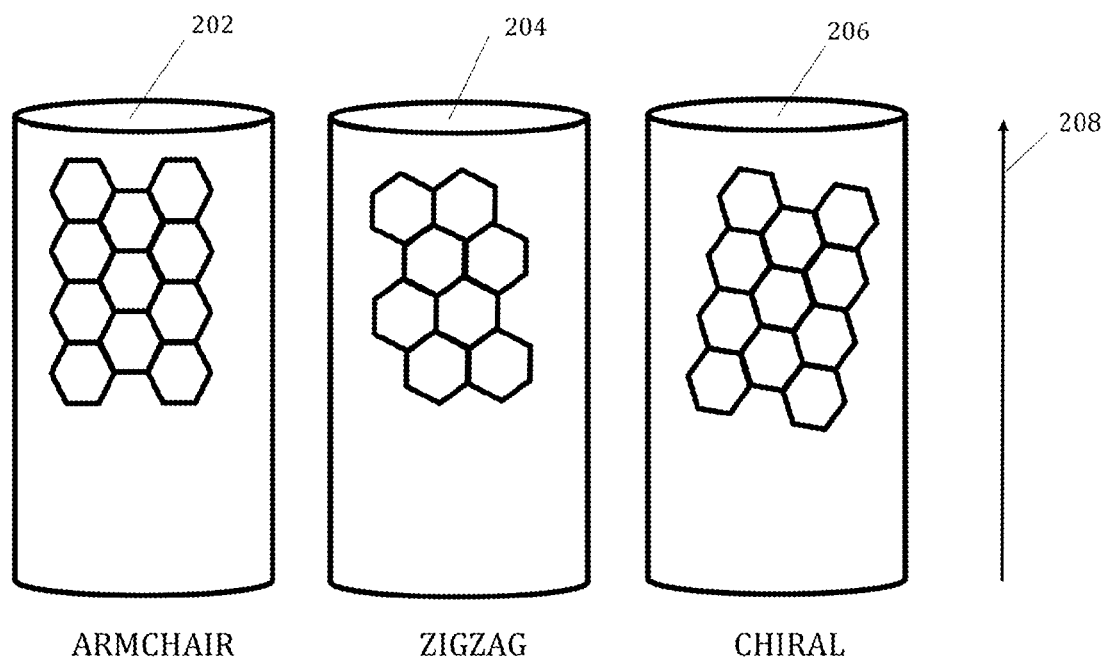
FIG. 2 shows diagrams of armchair, zigzag, and chiral carbon nanotubes.

Carbon nanotubes are allotropes of carbon with a cylindrical nanostructure. FIG. 1 shows the shows the carbon nanotube coordinate system 100 for determining which carbon nanotubes are armchair, zigzag, or chiral. Understanding FIG. 1 is enhanced by simultaneously viewing nanotubes 200 in FIG. 2, which show armchair 202, zigzag 204, and chiral 206 nanotubes. In FIG. 1, unit vectors $a_1$ 110 and $a_2$ 112 are defined. A vector describing the end of the nanotube is $na_1+ma_2$, where n denotes multiples of unit vector $a_1$ and m denotes multiples of unit vector $a_2$. Armchair nanotube 102, 202 is where n=m, as the end of the armchair nanotube is a linear combination of equal numbers of unit vectors $a_1$ 110 and $a_2$ 112, hence the general form of an armchair nanotube is (n,n) or $na_1+na_2$. Zigzag nanotube 104/204 has no $a_2$ 112 unit vectors used to describe the end of the nanotube, hence the general form of a zigzag nanotube is (n,0) or $na_1$. Chiral nanotubes have an unequal number of unit vectors $a_1$ 110 and $a_2$ 112 used to describe the end of the carbon nanotube, $na_1+ma_2$. In FIG. 1, the chiral pattern 106 shown is (5,2) or $C_h=na_1+ma_2=5a_1+2a_2$. Another way of determining which nanotubes are armchair, zigzag, or chiral is that armchair nanotubes 202 have two opposing facets of each carbon hexagon which are perpendicular to longitudinal axis 208; while zigzag nanotubes 204 have two opposing facets of each carbon hexagon which are parallel to longitudinal axis 208; and the carbon hexagons in chiral nanotubes 206 form a spiral pattern and have no facets that are either perpendicular or parallel to longitudinal axis 208.

Because of the symmetry and unique electronic structure of graphene, the structure of a nanotube strongly affects its electrical properties. The chemical bonding of carbon nanotubes is composed entirely of $sp^2$ bonds, similar to those of graphite. As shown in Table 300, FIG. 3, for a given carbon nanotube in which n=m have electrons in their conduction bands at room temperature, conduct electricity very well, and are called metallic nanotubes. Carbon nanotubes with n−m being a nonzero multiple of 3 are semiconducting with a narrow bandgap. All other structures produce nanotubes that are true semiconductors, with a band gap typically between 0.5 and 3.5 electron-Volts. Thus all armchair (n=m) carbon nanotubes are metallic, and chiral carbon nanotubes (6,4), (9,1), etc. where n−m is not a multiple of 3 are moderately semiconducting.

Figure 4:
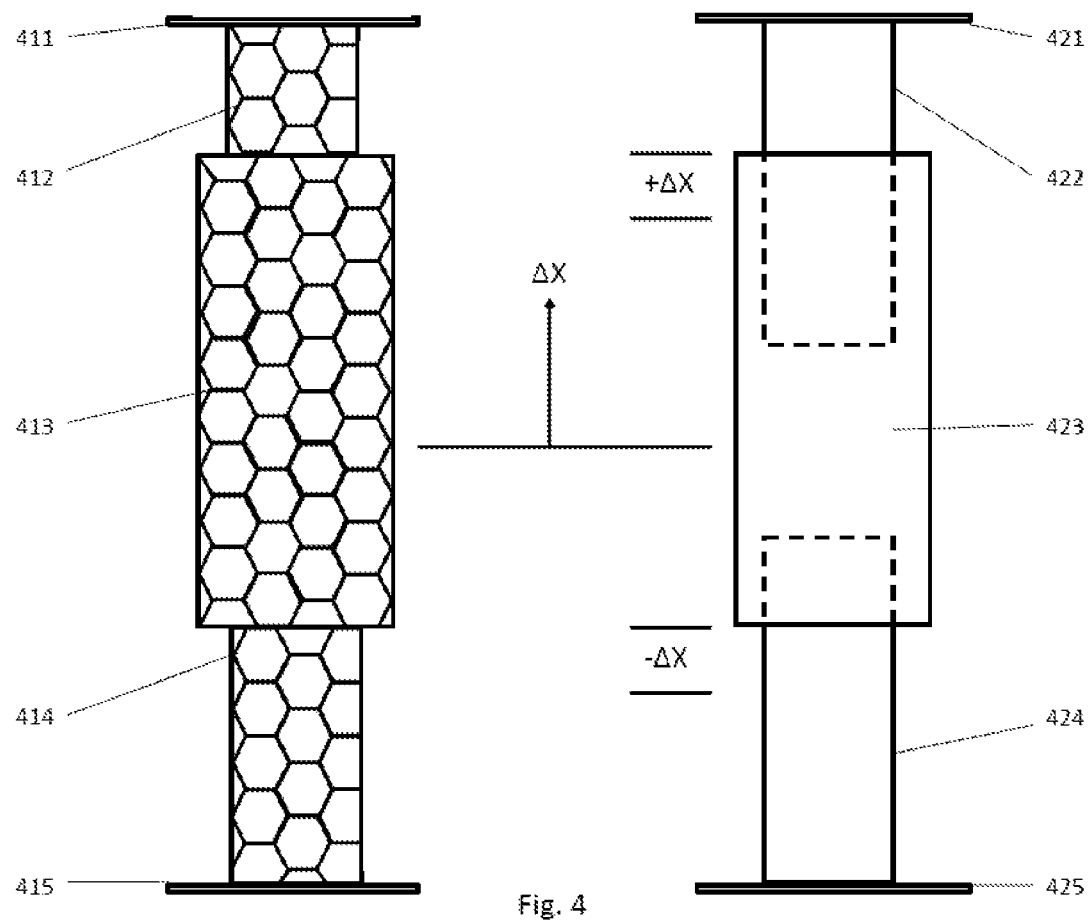
FIG. 4 shows two views of a DWCNT linear-differential-displacement sensor, where the larger diameter nanotube slides exterior to two smaller diameter nanotubes.

FIG. 4 shows two views of a DWCNT differential-displacement sensor. The left view shows conductive end plates 411 and 415, smaller diameter fixed nanotubes 412 and 414, and larger diameter sliding nanotube 413, where nanotubes 412, 413, and 414 are drawn to show carbon atoms. Smaller diameter fixed nanotubes 412 and 414 both have the same outer diameter. The inner diameter of nanotube 413 is larger than the outer diameter of smaller diameter fixed nanotubes 412 and 414. The right view is a block-diagram form of the left view, showing conductive end plates 421 and 425, smaller diameter fixed nanotubes 422 and 424, and larger diameter sliding nanotube 423. Larger diameter nanotube 413/423 slides in the +/−ΔX direction, which is along the longitudinal axis of nanotubes 412/422, 413/423, and 414/424. Larger diameter carbon nanotube 413/123 slides exterior to two smaller diameter carbon nanotubes, 412/422 and 414/424. Carbon nanotubes 412, 413, and 414 are coaxial, as are carbon nanotubes 423, 424, and 425.

Carbon nanotube 412/422 is fixedly and electrically attached on one end to conducting plate 411/421. Similarly, carbon nanotube 414/424 is fixedly attached on one end to conducting plate 415/425. As nanotube 413/423 slides a displacement +ΔX longitudinally outside of nanotubes 412/422 and 414/424, the exterior of nanotube 412/422 is covered a +ΔX and the exterior of nanotube 414/424 is uncovered a −ΔX. Thus a differential change of 2ΔX is physically created.

Figure 5:
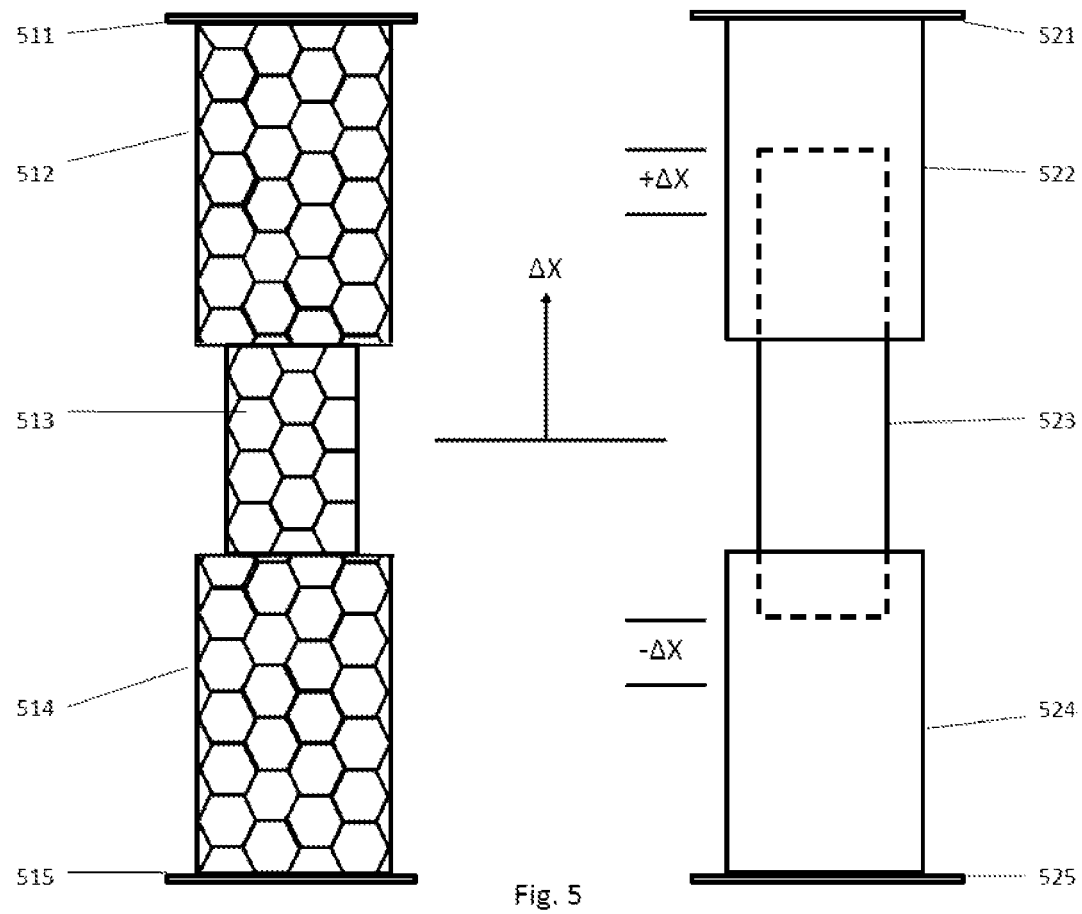
FIG. 5 shows two views of a DWCNT linear-differential-displacement sensor, where the smaller diameter nanotube slides interior to two larger diameter nanotubes.

Similar to FIG. 4, FIG. 5 shows two views of a DWCNT differential-displacement sensor. The left view shows conductive end plates 511 and 515, larger diameter fixed nanotubes 512 and 514, and smaller diameter sliding nanotube 513, where nanotubes 512, 513, and 514 are drawn to show carbon atoms. Larger diameter fixed nanotubes 512 and 514 both have the same inner diameter. Smaller diameter sliding nanotube 513 has an outer diameter smaller than the inner diameter of larger diameter fixed nanotubes 512 and 514. The right view is a block-diagram form, showing conductive end plates 521 and 525, larger diameter fixed nanotubes 522 and 524, and smaller diameter sliding nanotube 523. Smaller diameter nanotube 513/523 slides in the +/−ΔX direction, which is along the longitudinal axis of nanotubes 512/522, 513/523, and 514/524. Smaller diameter carbon nanotube 513/523 slides interior to two larger diameter carbon nanotubes, 512/522 and 514/524. Carbon nanotubes 512, 513, and 514 are coaxial, as are carbon nanotubes 523, 524, and 525.

Carbon nanotube 512/522 is fixedly attached on one end to conducting plate 511/521. Similarly, carbon nanotube 514/524 is fixedly attached on one end to conducting plate 515/525. As nanotube 513/523 slides a displacement +ΔX longitudinally inside of nanotubes 512/522 and 514/524, the interior of nanotube 512/522 is covered a +ΔX and the interior of nanotube 514/524 is uncovered a −ΔX. Thus a differential change of 2ΔX is physically created in FIG. 5 as it was in FIG. 4.

In order that carbon nanotubes 412/422, 413/423, 414/424, 512/522, 513/523, and 514/524 have the electrical property of being metallic, per Table 300 of FIG. 3, n=m. Thus, carbon nanotubes 412/422, 413/423, 414/424, 512/522, 513/523, and 514/524 are of the armchair variety.

Figure 6:
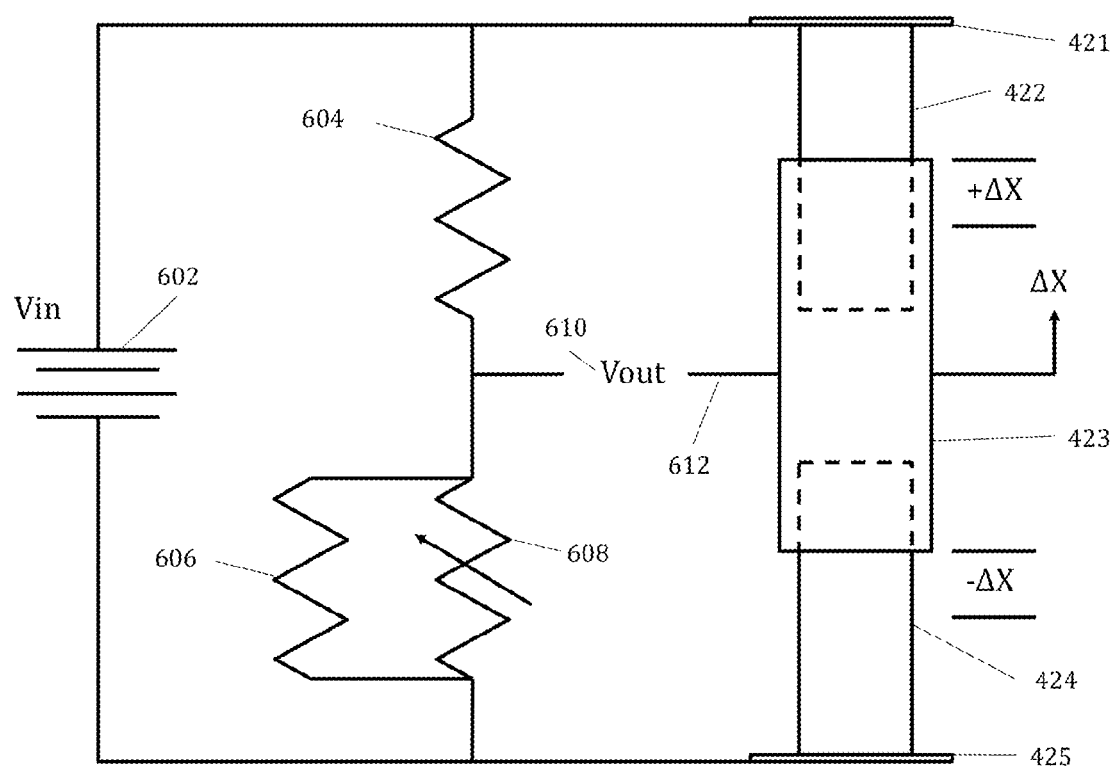
FIG. 6 depicts auxiliary DC electrical circuitry used to convert the physical displacement of sliding nanotube into an electronic signal.

FIG. 6 depicts auxiliary DC electrical circuitry used to convert the physical displacement $\Delta X$ of sliding nanotube 423 into an electronic signal Vout 610. Direct current (DC) voltage Vin 602 is electrically connected to conductive end plates 421 and 425. A first end of resistor 604 is electrically connected to conductive end plate 421 and a first end of resistor 608 is electrically connected to conductive end plate 425. A second end of resistor 604 is electrically connected a second end of resistor 608, and that becomes the first of two points from which Vout 610 is measured. A first end of nanowire 612 is electrically connected to sliding nanotube 423, and a second end of nanowire 612 becomes the second of two points from which Vout 610 is measured. In another embodiment, Vin 602 is an alternating voltage. This alternating voltage may be a sine-wave at a specific frequency, to allow filtering by filter 804, FIG. 8, of Vout 610 at that specific frequency to rule out as much noise as possible to improve the signal-to-noise ratio.

Resistor 608 is a variable resistor and is used to reduce Vout to near-zero volts when $\Delta X$ equals zero. This way, amplification of Vout shown in FIG. 5 does not include a large DC offset voltage, the amplification of which could produce a very low signal-to-noise ratio. Variable resistor 608 may be an analog variable resistor such as a precision 10-turn potentiometer, or a digitally programmable resistor. Also shown in FIG. 6 is optional calibration resistor 606, which is removably connected across variable resistor 608. Calibration resistor 606 is used to simulate a specific displacement $\Delta X$, which can come in very handy for understanding Vout.

As nanotube 423 moves in the $+\Delta X$ direction, a change in resistance $-\Delta R$ between nanotubes 422 and 423 is generated. At the same time, a change in resistance $+\Delta R$ between nanotubes 424 and 423 is generated. The ratio of Vout/Vin is then proportional to $-\Delta R-(+\Delta R)$ or $-2\Delta R$. If nanotube 423 moves in the $-\Delta X$ direction, the ratio of Vout/Vin is then proportional to $+\Delta R-(-\Delta R)$ or $+2\Delta R$. Thus, FIG. 6 registers twice the change in resistance from using one stationary nanotube and one sliding nanotube as a displacement sensor.

Figure 7:
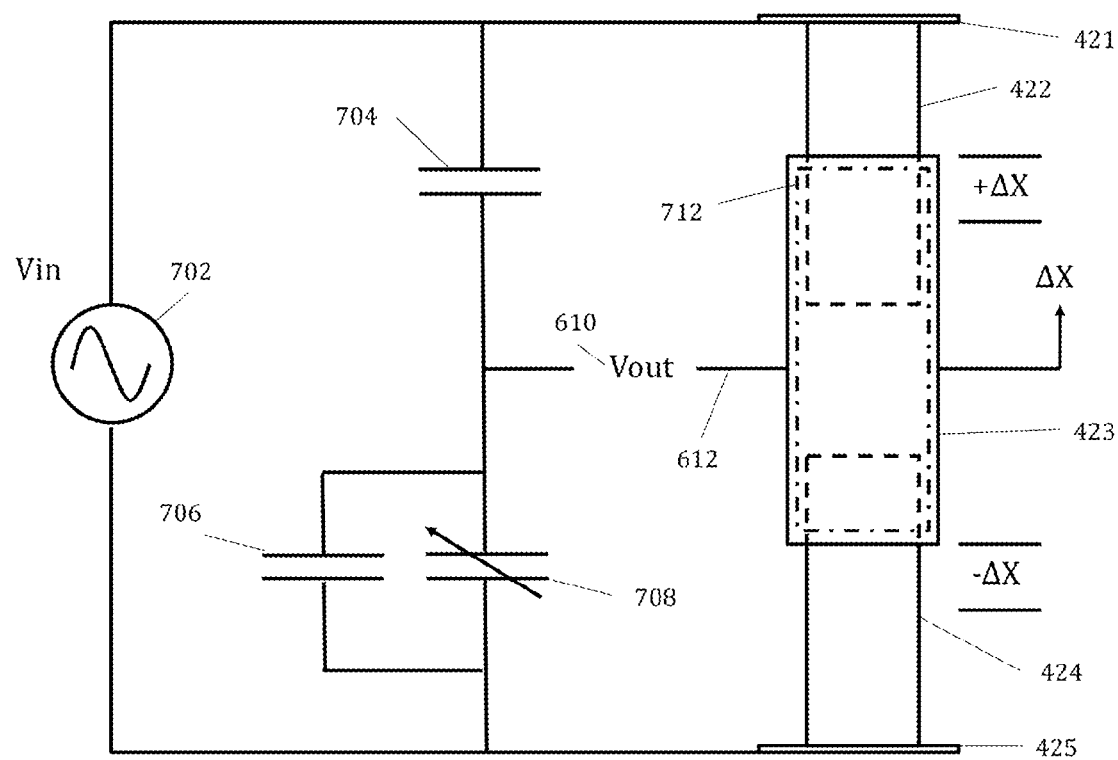
FIG. 7 depicts auxiliary AC electrical circuitry used to convert the physical displacement of sliding nanotube into an electronic signal.

FIG. 7 depicts auxiliary AC electrical circuitry used to convert the physical displacement $\Delta X$ of sliding nanotube 423 into an electronic signal Vout 610. Alternating current (AC) voltage Vin 702 is electrically connected to conductive end plates 421 and 425. A first end of capacitor 704 is electrically connected to conductive end plate 421 and a first end of capacitor 708 is electrically connected to conductive end plate 425. A second end of capacitor 704 is electrically connected a second end of capacitor 708, and that becomes the first of two points from which Vout is measured. A first end of nanowire 612 is electrically connected to sliding nanotube 423, and a second end of nanowire 612 becomes the second of two points from which Vout is measured.

Variable capacitor 708 may be an analog variable capacitor, or a digitally programmable capacitor. Also shown in FIG. 7 is optional calibration capacitor 706, which is removably connected across variable capacitor 708. Calibration resistor 606 is used to simulate a specific displacement $\Delta X$, which can come in very handy for understanding Vout.

Auxiliary semiconducting nanotube 712 is a dielectric cylinder that physically and electrically separates metallic nanotubes 422, 423, and 424. Per Table 300, FIG. 3, auxiliary semiconducting nanotube 612 is of the variety where n–m is neither zero nor a multiple of 3. Thus, auxiliary semiconducting nanotube 612 is not an armchair nanotube (n=m, giving n–m=0), not a zigzag (6,0) nanotube as n is a multiple of 3, and not a (5,2) chiral nanotube 106 of FIG. 1, as n–m is a multiple of 3. Auxiliary semiconducting nanotube 612 may be a zigzag nanotube where n is not a multiple of 3 or a chiral nanotube where n–m is not a multiple of 3, such as (6,4) or (9,1).

As nanotube 423 moves in the $+\Delta X$ direction, a change in capacitance $+\Delta C$ between nanotubes 422 and 423 is generated. At the same time, a change in capacitance $-\Delta C$ between nanotubes 424 and 423 is generated. The ratio of Vout/Vin is then proportional to $+\Delta C-(-\Delta C)$ or $2\Delta C$. If nanotube 423 moves in the $-\Delta X$ direction, the ratio of Vout/Vin is then proportional to $-\Delta C-(-\Delta C)$ or $-2\Delta C$. Thus, FIG. 7 registers twice the change in capacitance from using one stationary nanotube and one sliding nanotube as a displacement sensor.

Figure 8:
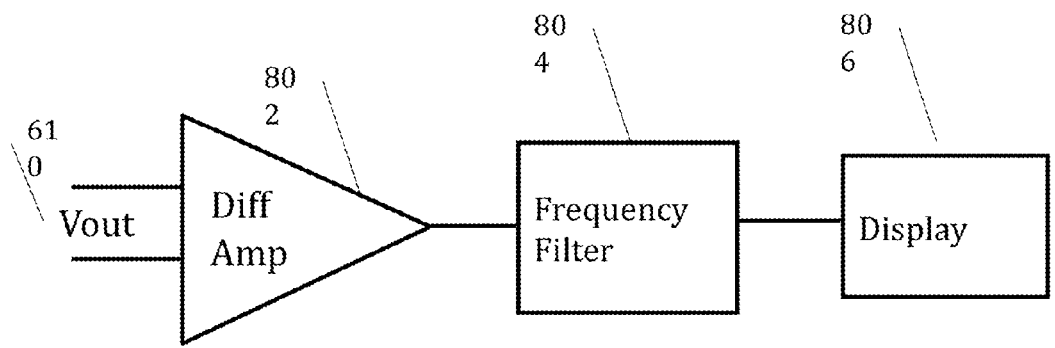
FIG. 8 depicts amplification and signal conditioning of electronic voltage signals from FIGS. 6 and 7.

FIG. 8 shows that Vout 610 enters differential amplifier 802, to prevent signal-to-noise degrading ground-loops, and to subtract common mode noise to improve the signal-to-noise ratio. The output of differential amplifier 802 goes into frequency filter 804. Even with differential amplifier 802, there is 60 Hz noise from lighting, power supplies, etc, which clouds the desired measurement. Filter 804 may be set to filter out 60 Hz and its harmonics. Filter 804 may be a low pass filter, a notch filter centered at 60 Hz, or a Butterworth filter. Filter 804 may be a narrow bandpass filter to allow only the frequency of Vout 610 that matches the excitation frequency of Vin 702 to pass, thus filtering out unwanted harmonics. The output of filter 804 goes into analog-to-digital converter 806 and then into computer 808 for subsequent storage and analysis.

Figure 9:
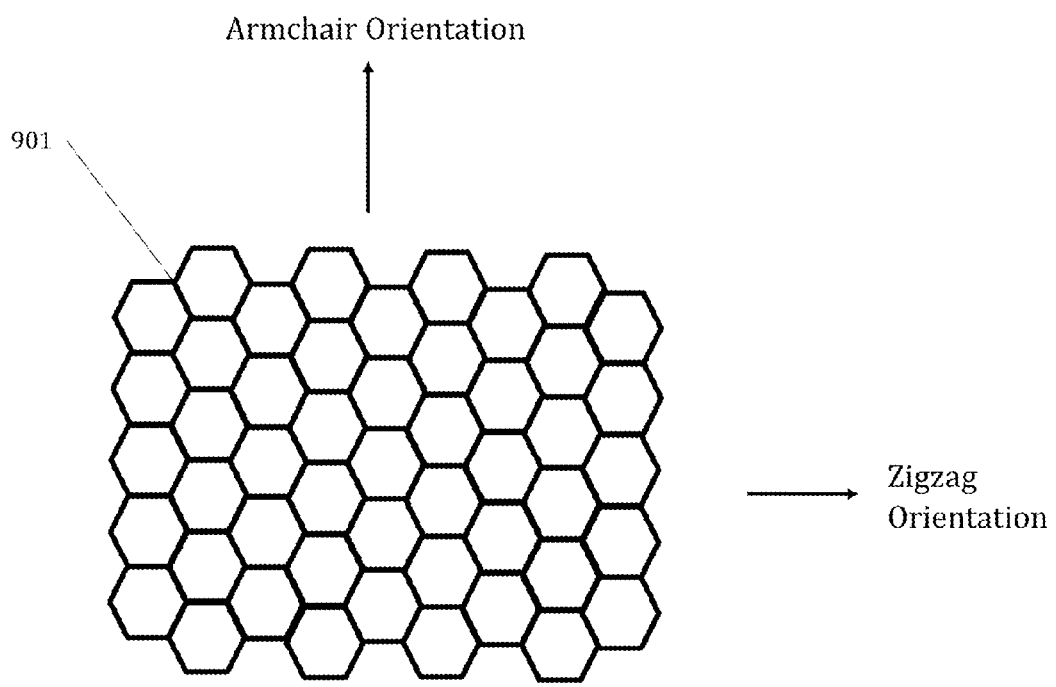
FIG. 9 depicts a graphene sheet.

FIG. 9 shows graphene sheet 901. There are two orientations, armchair and zigzag. Graphene sheet 901 is used in FIGS. 10-13.

Figure 10:
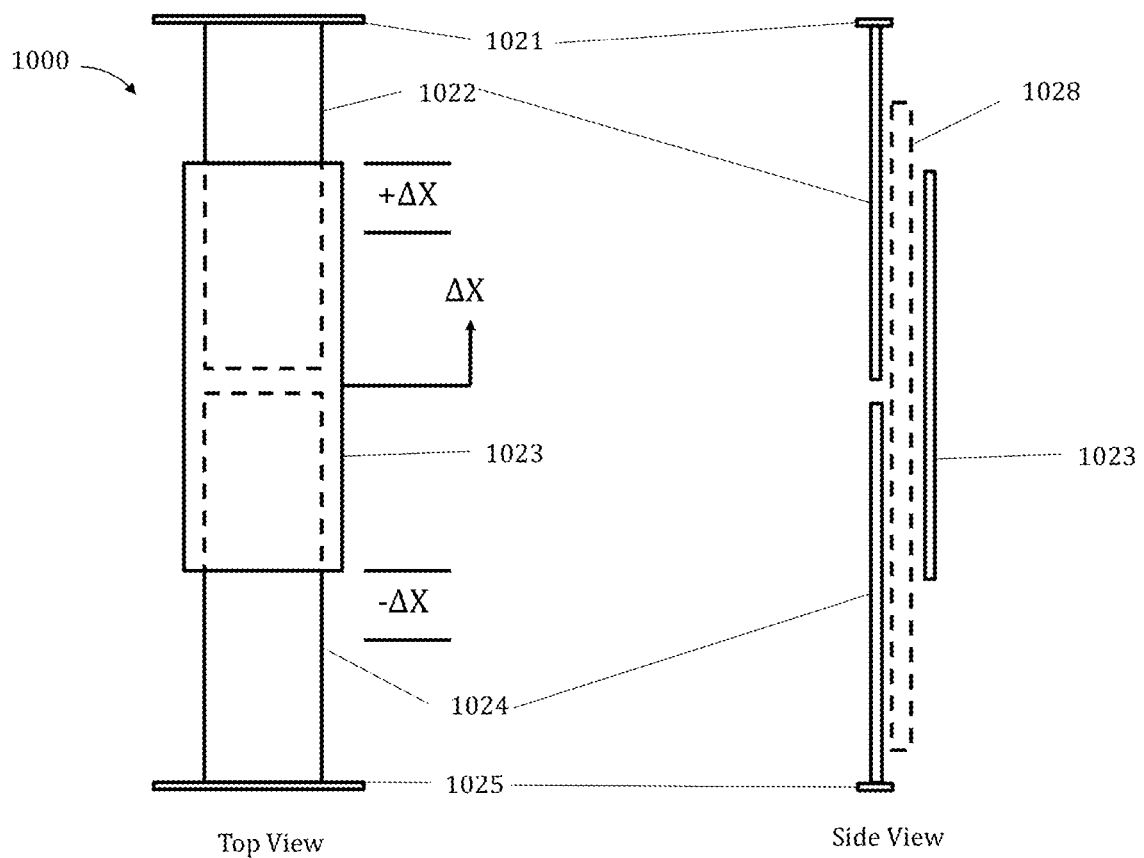
FIG. 10 depicts a graphene linear-differential-displacement sensor.

FIG. 10 shows a block-diagram of a graphene linear-differential-displacement sensor 1000, showing conductive end plates 1021 and 1025, graphene sheets 1022 and 1024, and graphene sheet 1023. Graphene sheet 1023 slides in the $+/-\Delta X$ direction. Graphene sheet 1022 is fixedly and electrically attached on one end to conducting plate 1021. Similarly, graphene sheet 1024 is fixedly attached on one end to conducting plate 1025. As graphene sheet 1023 slides a displacement $+\Delta X$ longitudinally relative to graphene sheets 1022 and 1024, graphene sheet 1022 is covered a $+\Delta X$ and graphene sheet 1024 is uncovered a $-\Delta X$. Thus a differential change of $2\Delta X$ is physically created. The side view of FIG. 10 shows dielectric film 1028 interposed between graphene sheets 1022 and 1024, and graphene sheets 1023. This dielectric film 1028 is used when graphene linear-differential-displacement sensor 1000 is used in a capacitive mode, as shown in FIG. 11.

Figure 11:
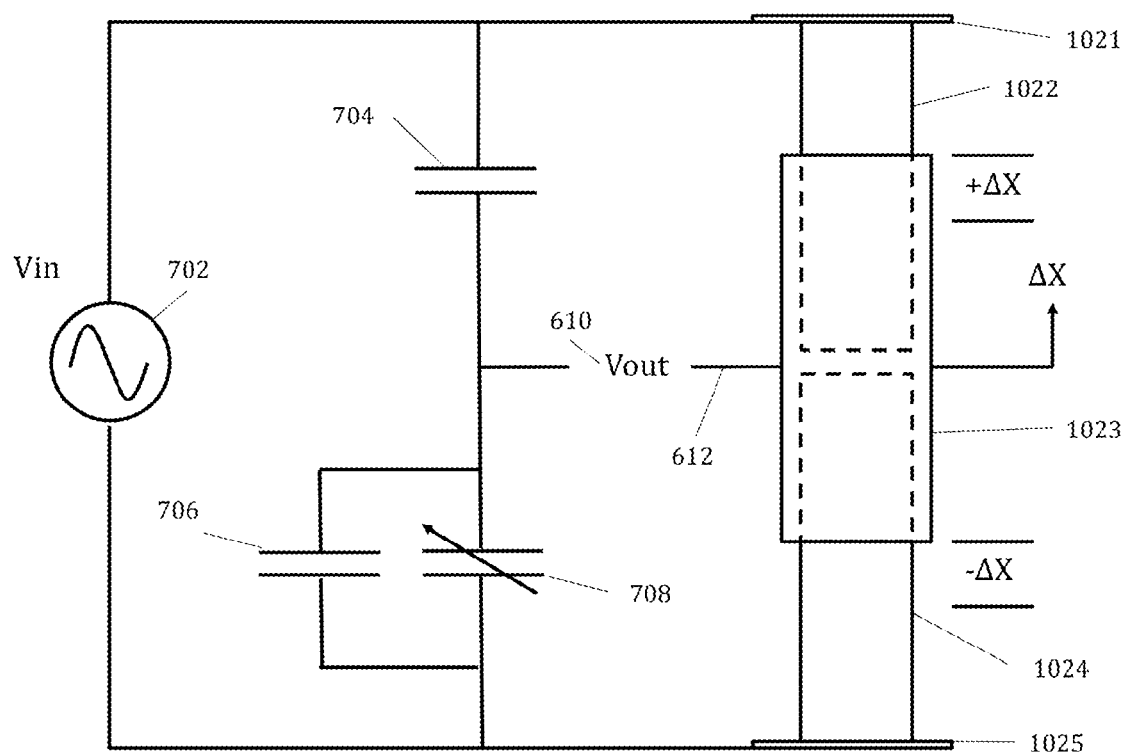
FIG. 11 depicts auxiliary AC electrical circuitry used to convert the physical displacement of sliding graphene sheet into an electronic signal.

FIG. 11 depicts auxiliary AC electrical circuitry used to convert the physical displacement $\Delta X$ of sliding graphene sheet 1023 into an electronic signal Vout 610. Alternating current (AC) voltage Vin 702 is electrically connected to conductive end plates 1021 and 1025. A first end of capacitor 704 is electrically connected to conductive end plate 1021 and a first end of capacitor 708 is electrically connected to conductive end plate 1025. A second end of capacitor 704 is electrically connected a second end of capacitor 708, and that becomes the first of two points from which Vout is measured. A first end of nanowire 612 is electrically connected to sliding graphene sheet 1023, and a second end of nanowire 612 becomes the second of two points from which Vout is measured.

Figure 12:
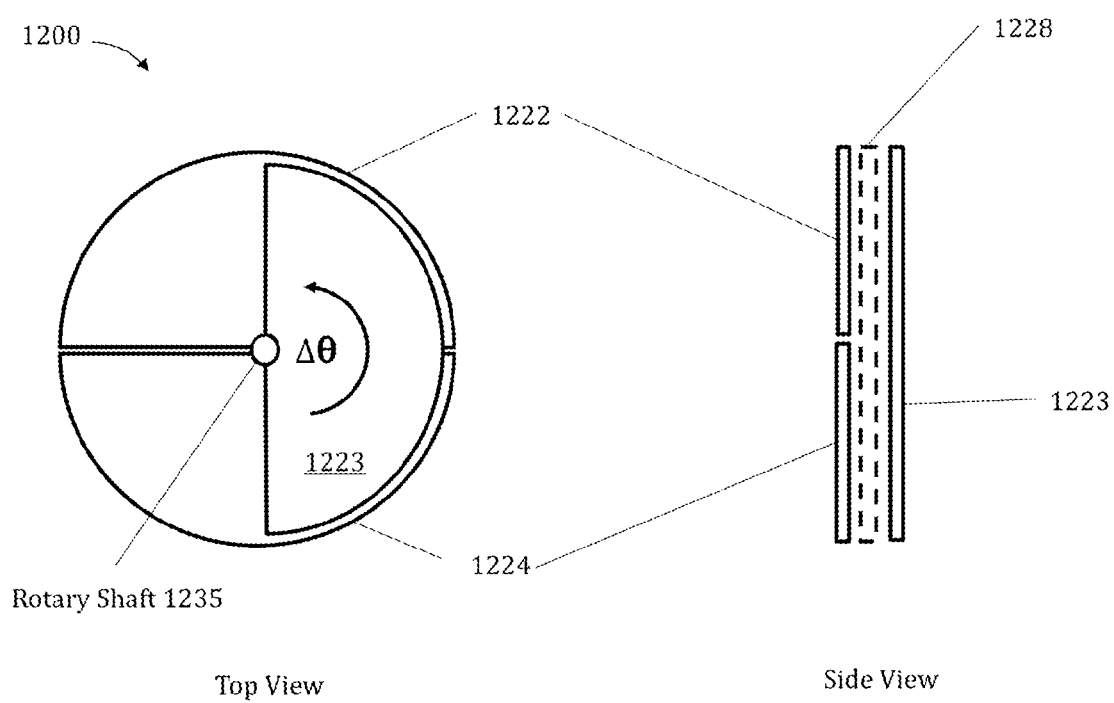
FIG. 12 depicts a graphene rotational-differential-displacement sensor.

FIG. 12 shows top and side views of graphene rotational-differential-displacement sensor 1200. Graphene rotational-differential-displacement sensor comprises graphene semicircles 1222 and 1224, and graphene semicircle 1223. Graphene semicircle 1223 may rotate about optional rotational shaft 1235. As graphene semicircle 1223 rotates, it uncovers graphene semicircle 1224, and simultaneously covers graphene semicircle 1222, to produce a differential change of 2ΔΘ. The side view of FIG. 12 shows dielectric film 1228 interposed between graphene semicircles 1222 and 1224, and graphene semicircle 1223. This dielectric film 1228 is used when graphene rotational-differential-displacement sensor 1200 is used in a capacitive mode, as shown in FIG. 13.

Figure 13:
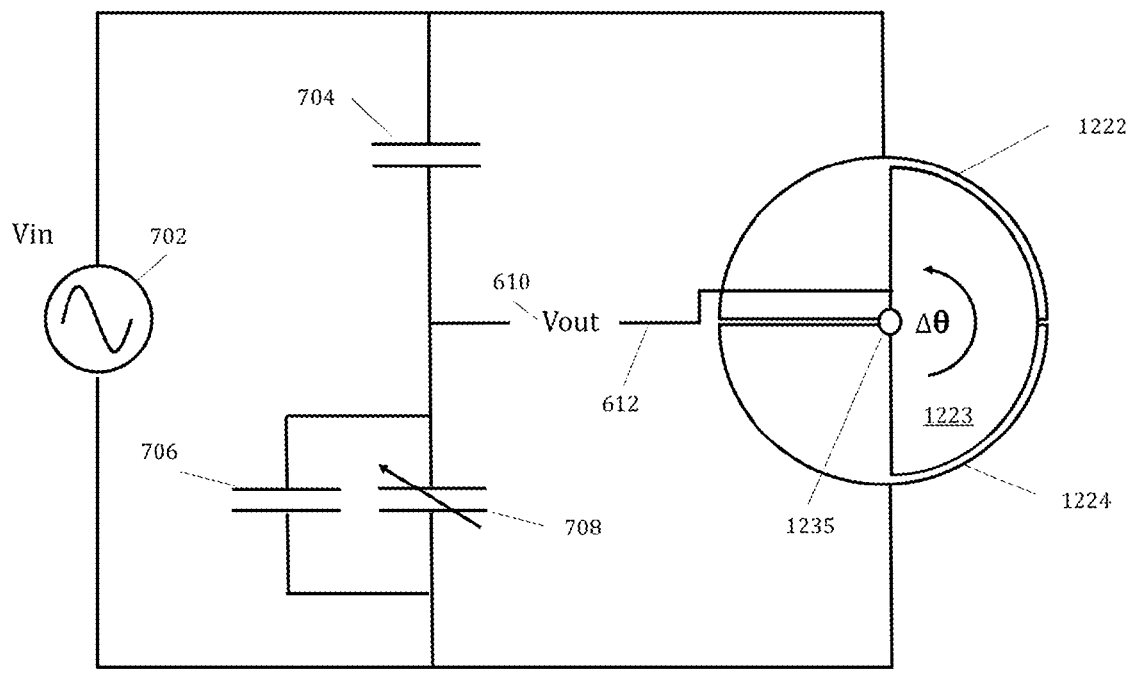
FIG. 13 depicts auxiliary AC electrical circuitry used to convert the physical rotation of sliding graphene sheet into an electronic signal.

FIG. 13 depicts auxiliary AC electrical circuitry used to convert the physical displacement ΔΘ of rotating graphene sheet 1223 into an electronic signal Vout 610. Alternating current (AC) voltage Vin 702 is electrically connected to graphene sheets 1222 and 1224. A first end of capacitor 704 is electrically connected to graphene sheet 1222 and a first end of capacitor 708 is electrically connected to graphene sheet 1224. A second end of capacitor 704 is electrically connected a second end of capacitor 708, and that becomes the first of two points from which Vout is measured. A first end of nanowire 612 is electrically connected to rotating graphene sheet 1223, and a second end of nanowire 612 becomes the second of two points from which Vout is measured.

In an alternate embodiment, graphene sheets 1022, 1023, and 1024 may themselves be rectangular, square, circular, triangular, pentagonal, or hexagonal. In an alternate embodiment, graphene sheets 1222, 1223, and 1224 may themselves be square, rectangular, triangular, pentagonal, or hexagonal. Graphene sheets 1022-1024 and 1222-1224 may range from larger-sized sheets of graphene, the size that might be used to be a protective layer for an optical disk or display screen on a smart phone, down to smaller quantum-dot-sized sheets of graphene.

While the invention has been shown and described with reference to a particular embodiment thereof, it will be understood to those skilled in the art, that various changes in form and details may be made therein without departing from the spirit and scope of the invention.

What is claimed is:

1. A differential displacement sensor, comprising:
   a pair of aligned stationary carbon nanostructures;
   a moveable carbon nanostructure configured to engage and move with respect to said pair of aligned stationary carbon nanostructures throughout a range of motion; and
   circuitry to apply an excitation voltage across said pair of aligned stationary carbon nanostructures and said moveable carbon nanostructure to generate an output voltage proportional to a displacement of said moveable carbon nanostructure with respect to said pair of aligned stationary carbon nanostructures throughout the range of motion.

2. The differential displacement sensor of claim 1, wherein said pair of aligned stationary carbon nanostructures are both carbon nanotubes, wherein said moveable carbon nanostructure is a carbon nanotube, wherein the carbon nanotubes forming said pair of aligned stationary carbon nanostructures are axially aligned with the carbon nanotube forming said moveable carbon nanostructure.

3. The differential displacement sensor of claim 2, wherein the carbon nanotubes forming said pair of aligned stationary carbon nanostructures both have the same inner diameter.

4. The differential displacement sensor of claim 3, wherein the carbon nanotube forming said moveable carbon nanostructure has an outer diameter smaller than the inner diameter of the carbon nanotubes forming said pair of aligned stationary carbon nanostructures, wherein each end of the carbon nanotube forming said moveable carbon nanostructure slides within one of the carbon nanotubes forming said pair of aligned stationary carbon nanostructures.

5. The differential displacement sensor of claim 2, wherein the carbon nanotubes forming said pair of aligned stationary carbon nanostructures both have the same outer diameter.

6. The differential displacement sensor of claim 5, wherein the carbon nanotube forming said moveable carbon nanostructure has an inner diameter larger than the outer diameter of the carbon nanotubes forming said pair of aligned stationary carbon nanostructures, wherein each end of the carbon nanotube forming said moveable carbon nanostructure slides over one of the carbon nanotubes forming said pair of aligned stationary carbon nanostructures.

7. The differential displacement sensor of claim 2, wherein the carbon nanotubes forming said moveable carbon nanostructure and said pair of aligned stationary carbon nanostructures are armchair carbon nanotubes.

8. The differential displacement sensor of claim 2, further comprising an auxiliary nanowire secured to said moveable carbon nanostructure from which a differential output voltage is measured.

9. The differential displacement sensor of claim 2, further comprising an auxiliary carbon nanotube secured to said moveable carbon nanostructure from which a differential output voltage is measured, wherein said auxiliary carbon nanotube has a zigzag configuration.

10. The differential displacement sensor of claim 1, wherein said excitation voltage is a DC voltage.

11. The differential displacement sensor of claim 1, wherein said excitation voltage is an AC voltage.

12. The differential displacement sensor of claim 7, further comprising:
    a chiral nanotube interposed between the carbon nanotube forming said moveable carbon nanostructure and the carbon nanotube forming said pair of aligned stationary carbon nanostructures.

13. The differential displacement sensor of claim 1, wherein said pair of aligned stationary carbon nanostructures are both sheets of graphene, wherein said moveable carbon nanostructure is a sheet of graphene.

14. The differential displacement sensor of claim 13, wherein the sheet of graphene forming said moveable carbon nanostructure rotates with respect to the graphene sheets forming said pair of aligned stationary carbon nanostructures.

15. The differential displacement sensor of claim 13, wherein the sheet of graphene forming said moveable carbon nanostructure moves linearly with respect to the graphene sheets forming said pair of aligned stationary carbon nanostructures.

16. The differential displacement sensor of claim 13, further comprising: a thin film dielectric layer, wherein the graphene sheets forming said pair of aligned stationary carbon nanostructures are coplanar, residing in a first plane, wherein the graphene sheet forming said moveable carbon nanostructure resides in a second plane parallel to the first plane, wherein said thin film dielectric layer is interposed between said first and second planes.

17. The differential displacement sensor of claim 1, wherein said moveable carbon nanostructure increasingly engages one of said pair of aligned stationary carbon nanostructures while simultaneously decreasingly engaging the other of one of said pair of aligned stationary carbon nanostructures when said moveable carbon nanostructure moves with respect to said pair of aligned stationary carbon nanostructures.

18. A nanotube displacement sensor, comprising:
a first stationary carbon nanostructure;
a moving carbon nanostructure, said moving carbon nanostructure partially engaging said first stationary carbon nanostructure throughout a range of motion; and
circuitry that applies an excitation voltage across said first stationary carbon nanostructure and said moving carbon nanostructure to generate an output voltage proportional to the displacement of said moving carbon nanostructure with respect to said first stationary carbon nanostructure throughout the range of motion.

19. The nanotube displacement sensor of claim 18, wherein said first stationary carbon nanostructure is a carbon nanotube, wherein said moving carbon nanostructure is a carbon nanotube.

20. The nanotube displacement sensor of claim 18, wherein said first stationary carbon nanostructure is a sheet of graphene, wherein said moving carbon nanostructure is a sheet of graphene.

* * * * *